United States Patent Office 3,293,941
Patented Dec. 27, 1966

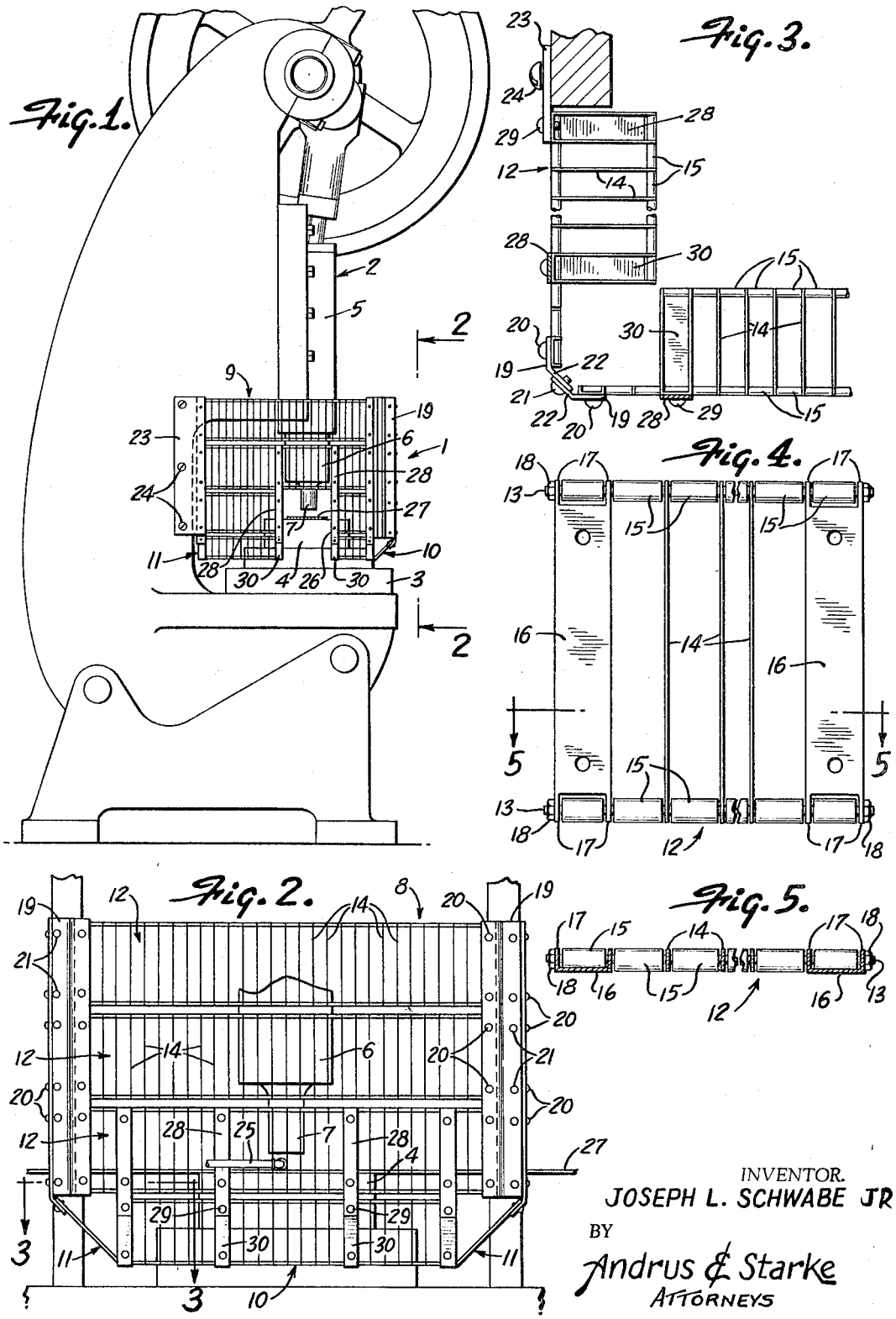

3,293,941
SAFETY GUARD
Joseph L. Schwabe, Jr., West Allis, Wis., assignor to Acro Metal Stamping Company, Milwaukee, Wis., a corporation of Wisconsin
Filed Oct. 29, 1964, Ser. No. 407,471
9 Claims. (Cl. 74—608)

This invention relates to a safety guard for a working tool such as a die press or machine tool.

Safety guards are generally employed with working tools, such as die presses, milling machines, drilling machines, and the like, to protect the operator. The safety guards serve to prevent the operator's hands or other objects from being inserted in the area of the tool, and yet the guard should be sufficiently open to permit the operator to see the tool and workpiece. In the past, various types of safety guards have been employed. One type of guard which has been commonly used is a screen or other perforated member which surrounds the area of the tool. Screens of this type are generally not adjustable and are made specifically for a given tool. In addition, the screen, unless made of heavy stock, can be easily deformed with the result that its function as a safety guard is decreased.

Other types of conventional safety guards employ a series of parallel rods which have some limited adjustment so that the shape of the guard can be varied to some degree to fit various types of tools. However, these guards are generally formed of relatively thick and heavy rods which provide limited visibility to the working area. Limited visibility is a serious drawback in that it causes eye strain and tension fatigue.

In the past, other safety guards have used plastic windows to improve visibility. However, during normal operation when oil is used as a lubricant, the plastic windows become smeared with oil, thereby restricting or preventing visibility with the result that the operator must reach behind the guard to clean off the window.

The present invention is directed to an improved safety guard designed with increased visibility and versatility. More specifically, the guard is composed of a series of modular panels which are connected together to provide the guard with the desired shape for any particular working tool. Each panel including a pair of supporting rods which support a series of thin metal tines. The tines have a substantially greater width than thickness and are positioned so that the thin edge of the tine is in alignment with the operator's line of vision, with the result that the tines provide greater visibility to the working area.

Each panel also includes a pair of end members which are secured to the supporting rods and the panels are joined together by corner brackets which are secured to the end members of the panels. With this type of construction, the panels can be connected together to provide any desired shape for the guard and enable the guard to readily conform to any type of tool.

The use of the thin metal tines provides complete protection for the operator and yet increases visibility to the workpiece by eliminating the bulky rods normally used in safety guards. This reduces eyestrain and tension fatigue and gives the operator more confidence in the working operation.

As the safety guard is composed of a series of interconnected panels, the guard can be readily adjusted to different sizes and shapes to allow the guard to conform to the shape of the tool or die enclosure. This results in the safety guard being reusable, for if the die or other tool is not to be used, the safety guard can be readily disassembled and reassembled into the desired shape for use with a second die or tool.

As the safety guard does not include plastic windows, or the like, the problem of oil smear which restricts visibility is eliminated.

Other objects and advantages will appear in the course of the following description.

The drawings illustrate the best mode presently contemplated of carrying out the invention.

In the drawings:

FIG. 1 is a side elevation of a die press incorporating the safety guard of the invention;

FIG. 2 is an enlarged fragmentary front elevation of the die press with the safety guard;

FIG. 3 is an enlarged plan view showing the connection of the panels by the corner brackets;

FIG. 4 is a plan view of a panel of the safety guard; and

FIG. 5 is a section taken along line 5—5 of FIG. 4.

The drawings illustrate a safety guard 1 connected to a die press 2 to prevent the operator from inserting his hand or other objects into the working area.

The press 2 comprising a bed 3 which carries a lower die member 4. A ram 5 is slidably mounted on the frame of the press 2 and carries a breach block 6 which supports an upper die member 7. The ram 5 is raised and lowered by a conventional crank mechanism to move the upper die toward and away from the lower die 4 to form the workpiece between the die members.

The press 2 itself is a conventional type and merely illustrates a tool with which the safety guard can be used.

The safety guard 1 includes a front section 8 and a pair of side sections 9 which are connected to the front section 8. In addition, the guard includes a downwardly extending diagonal front section 10 and a pair of diagonal lower side sections 11 which diverge inwardly toward the die members 4 and 7.

Each of the sections of the safety guard 1 is composed of a series of panels 12. As best shown in FIGS. 3–5, each panel includes a pair of spaced support rods 13 and a series of tines 14 are mounted in spaced relation on the support rods 13. The ends of the tines 14 are provided with openings which receive the rods 13 and the tines are spaced apart by a series of spacer sleeves 15 which are also disposed on the rods 13. The tines 14 are relatively thin, having a thickness in the range of $\frac{1}{64}$ to $\frac{3}{64}$ inch, preferably about $\frac{1}{32}$ inch, and have a substantially greater width than thickness. The tines 14 are positioned so that the thin edge is in alignment with the line of vision of the operator so that as the operator looks at the workpiece 7, the thin edges of the tines 14 provide a minimum obstruction to his vision.

The tines 14 are preferably formed of steel and are heat treated to increase their strength and hardness so that they cannot be deformed or bent by inserting an object between the tines.

Each panel 12 also includes a pair of end members 16 which are generally channel shaped with the web surface being disposed normal to the plane of the tines 14. The end members 16 are provided with end lugs 17 having openings to receive the rods 13. In addition, spacers 15 are located between the lugs 17 to maintain the proper spacing of the lugs. Nuts 18 are threaded or welded on the ends of rods 13 and serve to retain the tines 14, spacers 15 and end members 16 on the rods.

The panels 12 are connected together to provide the sections 8, 9, 10 and 11 by a series of corner brackets 19. As shown in FIG. 3, the corner brackets 19 are bent at about a 45° angle in cross section. Each corner bracket 19 is connected to the respective end member 16 by screws 20 which are threaded in suitable aligned openings in the corner bracket 19 and the end members 16. The corner brackets 19 are connected together to form the guard by a series of screws 21 which are threaded within aligned openings in the flanges 22 of the corner brackets.

By employing corner brackets 19 which are bent at a 45° angle, it is possible to position the sections, such as sections 8 and 9, at right angles and yet the sections of the guard can be disassembled without disassembling the panels 12 from each section. In contrast to this, if a single 90° corner bracket was used in place of the two 45° corner brackets 19, the disassembly of the 90° corner bracket would result in the panels 12 of each section being disconnected.

The vertical side edges of side section 9 are provided with end brackets 23 which are connected to the press 2 by screws 24. The end brackets 23 can be flat members or can be bent at an angle depending on the nature of the press and the surface to which the brackets are to be connected.

An air hose 25 or other operating member can be inserted between the tines 14 in the front section 8. The air from hose 25 can be used to eject the workpiece or for air operation. Additional openings can be provided in any of the sections 8, 9, 10 or 11, as desired, to permit auxiliary apparatus to be inserted into the area of the die members. As shown in FIG. 1, the side sections 9 are provided with openings 26 through which a workpiece 27 is moved.

To attach the diagonal sections 10 and 11 to the corresponding front and side sections, a series of connecting members 28 similar in construction to end members 16, are connected in the lower panels 12 of front and side sections. The lower ends of members 28 project downwardly beyond the front and side sections and are bent inwardly. The bent lower ends of members 28 are attached by screws 29 to corresponding connecting members 30 of the respective diagonal sections 10 and 11.

While the safety guard is shown as having a rectangular shape with diagonally diverging lower sections, it is contemplated that the panels 12 may be connected in any desired shape to conform to the die enclosure or working tool. Moreover, the panels can be made into any desired length by merely increasing the length of the rods 13 and inserting additional tines 14 and spacers 15. Thus, the safety guard is completely versatile and can be shaped into any configuration to fit the need.

This construction has a further advantage over the conventional type of adjustable-rod guard in that the front 8 and side sections 9 can be vertical, as shown in the drawings, and the lower sections 10 and 11 can diverge inwardly around the tool area. With the adjustable straight rod-type of guard, if the lower ends of the rods are brought inwardly around the work area, the upper ends of the rods diverge outwardly at a sharp angle to thereby provide a substantial increase in the overall dimension of the guard.

The use of the thin tines 14 substantially increases the visibility for the operator. The safety guard of the invention has about 75% open area and this is considerably greater than the conventional safety guard, resulting in the elimination of eyestrain and tension fatigue. As the operator's tension fatigue is reduced, the quality of the operation is increased.

The safety guard can be sold in kit form and the user can assemble it to fit his particular needs. Moreover, the press guard can be readily shifted from one piece of equipment to another merely by disassembling the panels and reassembling them in the desired shape or configuration. This is a substantial economic advantage over the conventional safety guard which is shaped for a particular tool and cannot be converted to other machines.

Various modes of carrying out the invention are contemplated as being within the scope of the following claims particularly pointing out and distinctly claiming the subject matter which is regarded as the invention.

I claim:

1. A safety guard for a working tool, comprising a series of interconnected panels disposed around the tool, each panel including a pair of spaced support members and a plurality of thin flat tines mounted on said support members, said tines having a substantially greater width than thickness and said tines being disposed in generally parallel planes normal to the axis of said support members whereby the thin edges of said tines are in alignment with the operator's line of vision, each panel also including a pair of end members located at the ends of the panel and mounted on said support members, each end member adapted to be connected to end members of adjacent panels.

2. A safety guard for a working tool, comprising a series of interconnected panels disposed around the tool, each panel including a pair of spaced support rods and a plurality of thin tines, said tines having openings in the ends thereof to receive said support rods, said tines being substantially flat and having a substantially greater width than thickness and being disposed in a series of parallel planes normal to the axis of said support rods, each panel also including a series of spacers mounted on said support rods and positioned between the ends of adjacent tines to space the tines apart, and each panel having a pair of end members located at the ends of the panel and having a generally flat central surface disposed in a plane normal to said parallel planes; and means connected to said central surfaces of the end members for joining the panels together to form the safety guard.

3. A safety guard for a working tool, comprising a panel disposed outwardly of the tool and including a pair of spaced support members and a plurality of thin generally flat tines mounted on said support members, said tines having openings in the ends thereof to receive said support members said tines having a substantially greater width than thickness and being disposed in generally parallel planes normal to the axis of said support members whereby the thin edges of the tines are in alignment with the operator's line of vision.

4. The structure of claim 1 in which the tines have a thickness in the range of 1/64 to 3/64 of an inch.

5. The structure of claim 3 in which the tines are formed of heat treated steel.

6. A safety guard for a working tool, comprising a series of interconnected panels disposed around the tool, each panel including a pair of spaced support members and a plurality of thin flat tines mounted on said support members, said tines having a substantially greater width than thickness and said tines being disposed in generally parallel planes normal to the axis of said support members whereby the thin edges of said tines are in alignment with the operator's line of vision, each panel also including a pair of end members located at the ends of the panel and mounted on said support members, each end member having a surface disposed in a plane normal to said parallel planes, and each panel including means associated with said surface of the end member for connecting the end member to adjacent panels to form said safety guard.

7. A safety guard for a working tool, comprising a series of interconnected panels disposed around the tool, each panel including a pair of generally horizontal support members and a plurality of thin vertical tines mounted on said support member, said tines having a substantially greater width than thickness and being disposed in generally parallel planes normal to the axis of said support members whereby the thin edges of the tines are in alignment with the operator's line of vision, each panel including a pair of end members located at the ends of the panel and mounted on the support members, each end member having a central surface disposed in a plane normal to said parallel plane, a series of said panels being disposed in vertical alignment to form a section of the safety guard and the end members of aligned panels being disposed in vertical alignment and a corner bracket having a first flange connected flatwise to the end members of the aligned panels and having a second flange disposed at an angle to the first flange and adapted to be connected to a corresponding flange of a second corner bracket.

8. The structure of claim 7 in which the second flange of the corner bracket is disposed at an angle of 45° with respect to the first flange.

9. A safety guard for a working tool, comprising a series of interconnected panels disposed around the tool, each panel including a pair of spaced support members and a plurality of thin flat tines mounted on said support members, said tines having a substantially greater width than thickness and said tines being disposed in generally parallel planes normal to the axis of said support members whereby the thin edges of said tines are in alignment with the operator's line of vision, each panel also including a pair of end members located at the ends of the panel and mounted on said support members, each end member having a plurality of openings with the axis of each opening disposed parallel to said parallel planes, said openings adapted to receive connecting members to join the panels together.

References Cited by the Examiner
UNITED STATES PATENTS

| | | | |
|---|---|---|---|
| 1,668,545 | 5/1928 | Boraks | 74—612 |
| 1,830,508 | 11/1931 | Freeburg | 74—612 |
| 2,557,300 | 6/1951 | Lowry | 74—612 |

FRED C. MATTERN, JR., *Primary Examiner.*

MILTON KAUFMAN, *Examiner.*

W. S. RATLIFF, *Assistant Examiner.*